United States Patent Office 2,777,870
Patented Jan. 15, 1957

2,777,870

FLUORINE-CONTAINING SILOXANES

Earl T. McBee, West Lafayette, Ind., and Ogden R. Pierce, Midland, Mich., assignors to Purdue Research Foundation, West Lafayette, Ind., a corporation of Indiana No Drawing. Application February 7, 1955,
Serial No. 486,734

7 Claims. (Cl. 260—448.8)

This invention relates to a group of novel organic compounds designated as fluorine-containing siloxanes and is more particularly concerned with aliphatic alkoxy siloxanes wherein the fluorine is present as a lower-perfluoroalkyl group.

The novel compounds of the present invention may be described as a polykis lower-perfluoroalkyl substituted alkoxy siloxane. The compounds may be illustrated by the following formula:

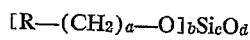

$$[R-(CH_2)_a-O]_b Si_c O_d$$

Among the lower-perfluoroalkyl groups represented by R are those having from 1 to about 8 carbon atoms. Subscripts "$a$," "$b$," "$c$," and "$d$" are all integers. "$a$" is an integer from 1 to 5. The integers "$b$," "$c$," and "$d$" always have the relationship that "$c$" equals "$d$" plus one, and "$b$" equals two times "$c$" plus two. Thus, for example, where "$d$" is the integer one, "$c$" is the integer two, and "$b$" is the integer six. Where "$d$" is the integer two, "$c$" is the integer three and "$b$" is the integer eight.

The novel compounds of the present invention are generally high-boiling liquids, boiling at about 120 to 250 degrees centigrade at pressures of 10 millimeters. They are useful as heat exchange media and high temperature hydraulic fluids.

The compounds of the present invention may be prepared by the reaction of a halosiloxane with a perfluoroalkyl substituted alcohol or a perfluoroalkyl substituted alkoxide salt. Suitable halosiloxanes which may be used include hexachloridisiloxane, hexabromodisiloxane, trichlorotribromosiloxane, et cetera.

The dry alcohol is charged into a reaction flask fitted with a reflux condenser and a stirrer. The halosiloxane is added dropwise to the alcohol, and the reaction mixture is then refluxed until the neutralization equivalent of the evolved gas shows that the reaction is theoretically nearly completed. The reaction mixture is then fractionally distilled. Very often two different lower-perfluoroalkyl substituted alkoxy siloxanes are thus obtained.

While the halosiloxane and the alcohol may be reacted over a wide range of molar ratios, for example one mole of halosiloxane to 7-17 moles of alcohol, the preferred molar ratio is one mole of halosiloxane to about 12 moles of alcohol.

The following examples indicate methods by which members of the new group of compounds may be prepared, but are in no way to be construed as limiting the invention thereto.

*Example 1.—The reaction of pentafluoropropanol with hexachlorodisiloxane*

Into a one-liter, two-necked flask with a thermometer well and a Y tube fitted with an addition funnel and a water condenser followed by a Dry-Ice condenser connected to an absorption flask, was placed 382.2 grams (2.55 moles) of 2,2,3,3,3-pentafluoropropanol. The alcohol was then heated and while it was refluxing 49.7 grams (0.175 mole) of hexachlorodisiloxane was added dropwise over a period of 100 minutes. The refluxing mixture was purged with a nitrogen stream for two hours and five minutes, and 1.05 equivalents of hydrogen chloride were collected (the theoretical amount from hexachlorodisiloxane). The mixture was fractionally disilled. There was thus obtained 42.4 grams of tetrakis-(2,2,3,3,3-pentafluoropropoxy)silane (39 percent of the theoretical yield) boiling at 81–82° C./10 mm.

Analysis:

Calculated for $(C_2F_5CH_2O)_4Si$____C, 23.09   H, 1.29
Found _____ 23.19      1.39

There was also obtained 59.0 grams (approximately 35 percent of the theoretical yield) of hexakis-(2,2,3,3,3-pentafluoropropoxy(disiloxane boiling at 123–123.8° C./10 mm.

Analysis:

Calculated for $(C_2F_5CH_2O)_6Si_2O$__C, 22.6   H, 1.26
Found _____ 22.42      1.30

There was also obtained 14.3 grams (9.3 percent of the theoretical yield) of octakis-(2,2,3,3,3-pentafluoropropoxy)trisiloxane boiling at 157–160° C./10 mm.

Analysis:

Calculated for $(C_2F_5CH_2O)_8Si_3O_2$_C, 22.18   H, 1.24
Found _____ 22.24      1.22

*Example 2.—The reaction of heptafluorobutanol with hexachlorodisiloxane*

The apparatus used was the same as in Example 1. Into the reaction vessel 211.2 grams of 2,2,3,3,4,4,4-heptafluorobutanol (1.056 mole) was distilled from Drierite. To this 35.9 grams of hexachlorodisiloxane (0.126 mole) was added dropwise over a period of 32 minutes. The reaction mixture was refluxed for 109 minutes, and for about the last 50 minutes was treated with a nitrogen stream. There was collected in the absorption flask 0.751 equivalent of hydrogen chloride. (The theoretical amount of hydrogen chloride from hexachlorodisiloxane is 0.756 equivalent.) The reaction mixture was rectified on a Todd column. There was thus obtained 23.4 grams of hexakis-(2,2,3,3,4,4,4-heptafluorobutoxy)disiloxane (14.7 percent of the theoretical yield) boiling at 147–153° C./10 mm. having a refractive index $(n_D^{20.5})$ of 1.3057.

Analysis:

Calculated for $(C_3F_7CH_2O)_6Si_2O$__C, 22.74   H, 0.95
Found _____ 22.78      1.00

There was also obtained 23.8 grams of octakis-(2,2,3,3,4,4,4-heptafluorobutoxy)trisiloxane (16.6 percent of the theoretical yield) boiling at 150–161° C./3 mm., having a refractive index $(n_D^{20.5})$ of 1.3070.

Analysis:

Calculated for $(C_3F_7CH_2O)_8Si_3O_2$_C, 22.52   H, 0.94
Found _____ 22.38      1.03

*Example 3.—The reaction of sodium 2,2,2-trifloroethoxide and hexachlorodisiloxane*

A three-liter, three-necked flask fitted with an addition funnel, a reflux condenser and a ball joint sealed Hershberg stirrer was charged with one liter of ether. Then 249.9 grams (2.5 moles) of trifluoroethanol was distilled from Drierite into the flask. To the alcohol-ether solution 23 grams (1 gram atom) of sodium was added in small pieces over a period of 25 minutes. Into the addition funnel was distilled 51.6 grams (0.18 mole) of hexachlorodisiloxane, which was added dropwise to the reaction mixture in the flask over a period of 20 minutes, with a moderate reflux of the ether. The reaction was continued overnight because of the slowness of the precipitation of the sodium chloride. Then the sodium chloride was separated from the solution by filtration through a large sintered glass funnel into a distilling flask connected to a short column. The filtration was extremely slow, requiring a total of 28 hours together with washing with ether. The ether was distilled off and the remaining solution was rectified. There was thus obtained 74.6 grams of tetrakis-(2,2,2-trifluoroethoxy)silane (16 percent of the theoretical yield) boiling at 165–166° C./750 mm.

There was also obtained 97 percent of the theoretical yield of hexakis-(2,2,2-trifluoroethoxy)disiloxane boiling at 163° C./741 mm.

Analysis:

Calculated for $(CF_3CH_2O)_6Si_2O$__C, 21.63  H, 1.82
Found _____ 21.71    1.76

Among the other kis lower-perfluoroalkyl substituted alkoxy siloxane compounds within the scope of the present invention which may be made by following the procedure of the preceding examples are:

$[C_2F_5—(CH_2)_6—O]_6Si_2O$
$[C_2F_5—(CH_2)_6—O]_8Si_3O_2$
$[C_4F_9—(CH_2)_4—O]_6Si_2O$
$[C_4F_9—(CH_2)_4—O]_8Si_3O_2$
$[C_5F_{11}—(CH_2)_3—O]_6Si_2O$
$[C_5F_{11}—(CH_2)_3—O]_8Si_3O_2$
$[C_8F_{17}—(CH_2)_2—O]_6Si_2O$
$[C_8F_{17}—(CH_2)_2—O]_8Si_3O_2$

Thus, for example by reacting hexachlorodisiloxane with $C_2F_5(CH_2)_6OH$, and following the procedure of Example 1, the fluorine containing siloxanes $[C_2F_5—(CH_2)_6—O]_6Si_2O$ and $[C_2F_5—(CH_2)_6—O]_8Si_3O_2$ may be prepared.

And by reacting hexachlorodisiloxane with $C_5F_{11}(CH_2)_3OH$ and following the procedure of Example 1, the fluorine-containing siloxanes $[C_5F_{11}—(CH_2)_3—O]_6Si_2O$ and $[C_5F_{11}—(CH_2)_3—O]_8Si_3O_2$ may be prepared.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A polykis lower-perfluoroalkyl substituted alkoxy lower-siloxane having not more than three silicon atoms.
2. A polykis lower-perfluoroalkyl substituted lower-alkoxy lower-polysiloxane having not more than three silicon atoms.
3. Hexakis-(2,2,3,3,3-pentafluoropropoxy)disiloxane.
4. Octakis-(2,2,3,3,3-pentafluoropropoxy)trisiloxane.
5. Hexakis-(2,2,3,3,4,4,4-heptafluorobutoxy)disiloxane.
6. Octakis-(2,2,3,3,4,4,4-heptafluorobutoxy)trisiloxane.
7. Hexakis-(2,2,2-trifluoroethoxy)disiloxane.

No references cited.